March 21, 1950          C. C. HEIN          2,501,331
LIQUID-COOLED RECTIFIER ASSEMBLY
Filed Feb. 24, 1947
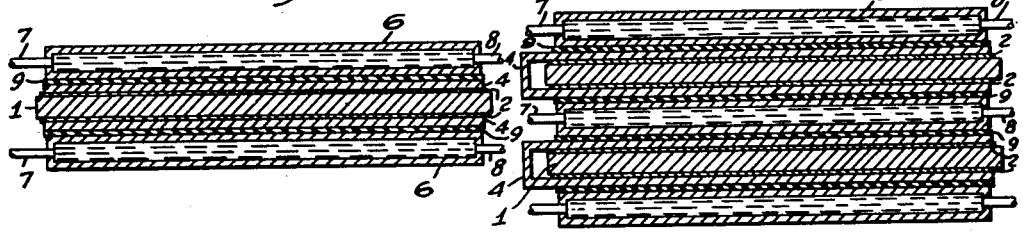
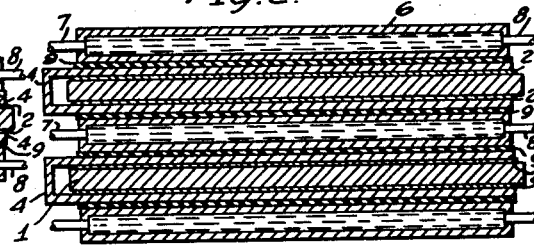
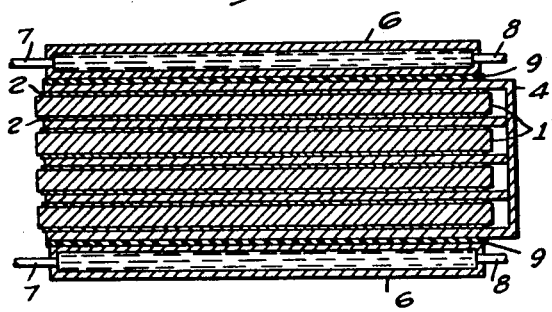
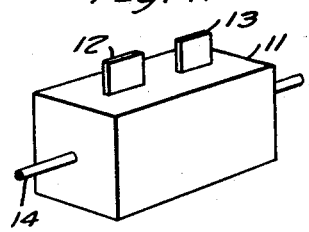
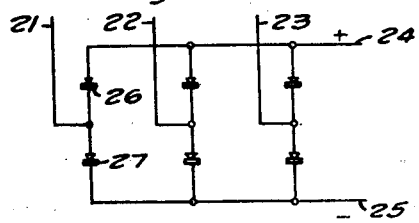
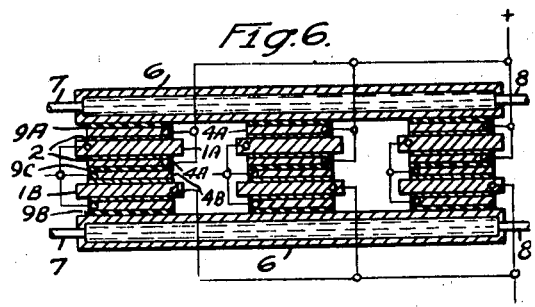
INVENTOR
Carl C. Hein.
BY
ATTORNEY
WITNESSES:

Patented Mar. 21, 1950

2,501,331

UNITED STATES PATENT OFFICE 2,501,331

LIQUID-COOLED RECTIFIER ASSEMBLY

Carl C. Hein, Forest Hills, Pa., assignor to Westinghouse Electric Corporation, East Pittsburgh, Pa., a corporation of Pennsylvania Application February 24, 1947, Serial No. 730,428

2 Claims. (Cl. 175—366)

My invention relates to rectifiers of the dry or contact-layer type, and in particular relates to arrangements for liquid-cooling such rectifiers. The power output which may be obtained from a dry rectifier of a given type and size is largely fixed by the ability to dissipate the heat generated in the rectifier by the flow of load current and of leakage current. In most commercial rectifiers heretofore convection of heat from cooling fins, either by natural draft or by fan blowers, has been relied upon to dissipate the internally generated heat. In certain instances, however, as explained by my United States Patent No. 2,179,293, issued November 7, 1939, for a Cooled contact rectifier, the heat has been dissipated by streams of liquid flowing through cooling ducts in intimate contact with the metallic structure of the rectifier. However, the liquid was in electrical contact with the parts of the rectifier which were at different electrical potentials and this necessitated the employment of liquids which were practically electrical insulators, e. g., oils, in order to prevent electrolytic decomposition of the circulating fluid. Furthermore, it was necessary to incorporate insulating sections in the cooling duct itself.

In view of the fact that the electrical insulators are likewise good heat insulators, it would seem at first sight to be impracticable to electrically insulate the cooling chambers from the metallic body of the rectifier, since the interposition of heat insulators in the path of outflow for the heat might appear to destroy the effectiveness of the cooling chambers. Contrary to this, however, I have found that by employing thin sheets of electrical insulation, such as mica, between the cooling chambers and the metallic body of the rectifiers it is possible to maintain the entire cooling system at ground potential without substantially destroying its heat dissipating effectiveness.

One object of my invention is, accordingly, to provide an improved form of rectifiers in which the power capacity is greatly increased by employing cooling chambers and ducts through which water or other suitable cooling liquid is continuously circulated.

Another object of my invention is to provide a contact rectifier in which is incorporated cooling means in the form of liquid-containing chambers electrically insulated from the rectifier body itself.

Still another object of my invention is to provide rectifier structures embodying cooling chambers of such form as to provide a compact and convenient rectifier structure of large power capacity.

Other objects of my invention will become apparent upon reading the following description taken in connection with the drawing, in which:

Figure 1 is a view partly in section of a plate-type rectifier provided with cooling chambers embodying the principles of my invention;

Fig. 2 is a similar view of a modification embodying the principles of Figure 1 in a plate-type rectifier comprising a plurality of separate plates having cooling chambers positioned adjacent both faces of each rectifier plate;

Fig. 3 is a modification of my invention in which plate-type rectifiers are effectively cooled when a plurality of rectifier plates connected electrically in multiple with each other are cooled by a single pair of cooling chambers positioned on opposite sides of plate assembly;

Fig. 4 is a perspective view of a convenient form of casing or container enclosing a rectifier of the type shown in detail in Fig. 3;

Fig. 5 is a schematic circuit diagram of a rectifier comprising a plurality of unit rectifiers suitably connected to furnish direct current to a load when energized from a three-phase alternating source;

Fig. 6 is a view partly in section of a convenient arrangement in which plate rectifiers may be assembled in the circuit shown in Fig. 5; and Fig. 7 is a perspective view of a suitable casing in which the rectifiers shown in Fig. 6 may be conveniently assembled.

Referring to detail in Figure 1, a rectifier plate 1 of the dry or contact type such, for example, as the copper-oxide rectifier or the selenium rectifier now well known in the art, has on its two opposite faces rectifying layers 2 which are faced, in turn, with contact layers 4. Such plate-type rectifiers are too well known in the art to need more detailed description here. In order to effectively dissipate the heat generated within the structure so far described, I provide a pair of hollow metallic chambers 6 preferably having a configuration similar to the contact plates 4. The chambers 6 are provided with suitable inlet pipes 7 and outlet-type pipes 8 through which they may be connected to any suitable water-circulating system (not shown). Between the chambers 6 and the contact layers 4 are interposed sheets 9 of any suitable insulating material such, for examples, as mica, shellac paper or glass cloth, the thickness of such insulation being made just great enough to withstand the maximum voltage between plate 1 and ground during the operation of the rectifier. Heat generated within the plate 1 will flow out through the layers 2, 4 and 9, and the chambers 6 will accordingly constitute a highly effective means of dissipating such heat.

It will usually be desired in rectifier practice to assemble more than a single plate into an operative rectifier and this may be done in the manner illustrated in Fig. 2 by forming an assembly in which rectifier plates like that in Figure 1 are sandwiched between cooling chambers which effectively dissipate heat from the plates disposed as do the chambers 6 in Figure 1. The contact plates 4 on opposite sides of rectifier plate 1 in each case may conveniently be connected to each other to form, with the rectifier plate 1, the opposite terminals of a single rectifier unit. Since the separate rectifier units are insulated from the cooling chambers 6, they are insulated from each other and may be connected together in any of the conventional circuits well known in the art, for example, in series or in multiple with each other.

While the arrangements of Figure 1 and Fig. 2 give the maximum possible heat-dissipating efficiency, I have found that for many purposes it is not necessary that the cooling chambers be interleaved between each pair of rectifier plates but that a number of plate rectifiers electrically connected in multiple may be sandwiched between a single pair of cooling chambers 6, as shown in Fig. 3. Thus, a plurality of assemblages, each comprising a plate 1 provided with contact layers 4, may be piled together, the contact layers 4 being connected together to form a single unit electrically and suitable leads (not shown) being used to likewise connect the plates 1 to each other. The faces of the pile or assembly thus made are faced with insulating sheets 9 and cooling chambers 6 are thus placed in good heat contact with the outer faces of the insulating sheet 9. In such an assemblage heat flows from various rectifiers in a direction normal to their faces into the cooling chambers 6. An assemblage, such as Fig. 3, evidently constitutes a single rectifier unit having a voltage rating equal to that of a single-plate rectifier and a current rating substantially equal to the sum of the current ratings of individual plate-rectifier units embodied.

The rectifier unit, shown in Fig. 3, may conveniently be enclosed in a casing of plastic or other suitable insulating material, as shown in Fig. 4, 11 is the casing having terminals 12 and 13, which project from its upper face, connected respectively to the contact layers 4 and the plates 1. The cooling chambers 6 are supplied with water by suitable connections to inlet pipes 14 projecting from the ends of the casing 11.

For many purposes it is desirable to provide rectifiers in which a single plate withstands the impressed voltage and which are capable of supplying current to a direct-current load from a three-phase alternating source. In such instances, the circuit arrangement shown in Fig. 5 may suitably be used. The three phases of the alternating-current source are connected respectively to the lines 21, 22, 23. Between the direct-current terminals 24 and 25 are connected three channels, each comprising a pair of rectifiers 26, 27 in series. The line 21 is connected to the common junction of one such pair, the line 22 is connected to the common junction of a second pair, and the line 23 is connected to the common junction of the third pair. While I have described the rectifiers 26 and 27 as comprising a single plate, it will be evident that a unit comprising a plurality of serially connected rectifier plates may be substituted for each of them when it is desired to handle larger voltages.

In Fig. 6, I show a convenient arrangement in which plate rectifiers may be assembled for efficient cooling using the circuit arrangement of Fig. 5. Thus, a pair of cooling chambers 6 similar to those already described have sandwiched between them three rectifier assemblies each comprising a pair of sheet insulators 9A and 9B adjacent the chambers 6, a pair of similarly poled plate rectifiers having their outer contact layers 4A and 4B in contact with the faces of the insulating sheets 9A—9B, and their adjacent contact layers 4A and 4B separated by a third insulating sheet 9C. It will be evident that to duplicate the connections indicated in Fig. 5 the contact layers 4A may be respectively connected to the rectifier plates 1B and to the three phases of an alternating-current supply, while the end contact plates 4B are connected together to the negative line of the direct-current circuit. The rectifier plates 1A are connected to the positive line of the direct-current circuit.

In Fig. 7, I have shown a convenient casing 31 which may be of plastic or other insulation containing the rectifier assembly shown in Fig. 6. The plates 4A of the rectifier assemblies are respectively connected to the terminals 32, 33, 34 projecting from the top of the casing 31. The contact plates 4B are connected to the contact terminal 36 which may be connected to the negative side of the direct-current circuit, while the rectifier plates 1A are connected to a contact plate 35 which may suitably be connected to the positive side of the direct-current circuit. Cooling water may be supplied to the chambers 6 through suitable inlet pipes 14 similar to those shown in Fig. 4.

I claim as my invention:

1. A plate-type rectifier assembly adapted to draw current from an $n$-phase alternating source and to supply current to a direct-current circuit comprising $n$ units each consisting of a pair of serially-related rectifiers having each of their outer terminals in contact with an insulating sheet, the insulating sheets adjacent one pole on each rectifier pair being placed in contact with one cooling chamber and a second cooling chamber being placed in contact with the insulating sheets adjacent the other terminal of said rectifier pairs, means for connecting the respective phases of said alternating-current line to the midpoints of said $n$ rectifier pairs, means for connecting one side of a direct-current circuit to the pole of said rectifier pairs adjacent one cooling chamber, and means for connecting the other side of said direct-current circuit to the pole of said rectifier pairs which is adjacent the other cooling chamber.

2. A rectifier pile comprising a pair of plate-type rectifiers having insulation between them, insulating sheets covering the non-adjacent faces of said rectifiers, means for connecting said rectifiers to a voltage source so that their corresponding poles differ in electrical potential, cooling chambers adjacent the outer faces of said insulating sheets, and a single source supplying a non-insulating cooling fluid to both said chambers.

CARL C. HEIN.

REFERENCES CITED

The following references are of record in the file of this patent:

UNITED STATES PATENTS

| Number | Name | Date |
|---|---|---|
| 1,797,587 | Peter | Mar. 24, 1931 |
| 2,146,311 | Pittman et al. | Feb. 7, 1939 |
| 2,179,137 | Stevens et al. | Nov. 7, 1939 |
| 2,179,293 | Hein | Nov. 7, 1939 |
| 2,189,617 | Siebert et al. | Feb. 6, 1940 |
| 2,316,553 | Brunke | Apr. 13, 1943 |
| 2,434,560 | Gunter | Jan. 13, 1948 |